United States Patent
Irigi et al.

(10) Patent No.: US 9,439,169 B2
(45) Date of Patent: Sep. 6, 2016

(54) REDUCING PAGING DELAYS USING LOCATION ANALYTICS IN COMMUNICATIONS NETWORKS

(71) Applicant: CISCO TECHNOLOGY, INC., San Jose, CA (US)

(72) Inventors: Srinivasa Reddy Irigi, San Jose, CA (US); RaghavendarRao Kota, Milpitas, CA (US); Swaminathan A. Anantha, San Jose, CA (US); Koh Yamashita, San Jose, CA (US); Madhusudan Nanjanagud, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/285,456

(22) Filed: May 22, 2014

(65) Prior Publication Data

US 2015/0341899 A1    Nov. 26, 2015

(51) Int. Cl.
*H04W 68/02* (2009.01)
*H04W 68/04* (2009.01)
*H04W 84/04* (2009.01)
*H04W 64/00* (2009.01)

(52) U.S. Cl.
CPC .............. *H04W 68/02* (2013.01); *H04W 68/04* (2013.01); *H04W 64/006* (2013.01); *H04W 84/045* (2013.01)

(58) Field of Classification Search
CPC ............. H04W 68/02; H04W 64/006; H04W 84/045; H04W 68/04
USPC ....... 455/456.1–456.6, 458, 426.1, 448, 453, 455/552.1
See application file for complete search history.

(56) References Cited

U.S. PATENT DOCUMENTS

| | | | |
|---|---|---|---|
| 7,593,722 B2 | 9/2009 | Jagadeesan | |
| 8,224,766 B2 | 7/2012 | Skibiski | |
| 8,983,459 B2* | 3/2015 | Bojeryd | 455/433 |
| 2008/0117875 A1* | 5/2008 | Bennett | H04W 36/32 370/331 |
| 2010/0118830 A1* | 5/2010 | Stephenson et al. | 370/331 |
| 2012/0330716 A1 | 12/2012 | Volpe | |
| 2012/0330721 A1 | 12/2012 | Volpe | |
| 2012/0330722 A1 | 12/2012 | Volpe | |
| 2013/0196689 A1 | 8/2013 | Smith | |
| 2013/0210454 A1* | 8/2013 | O'Sullivan et al. | 455/456.1 |

(Continued)

OTHER PUBLICATIONS

Dong-Jun Lee, et al., Intelligent Paging Strategy Based on Location Probability of Mobile Station and Paging Load Distribution in Mobile Communication Networks, IEEE Communications Society, © 2004, pp. 128-132; http://ieeexplore.ieee.org/xpls/abs_all.jsp?arnumber=1312466&tag=1.

*Primary Examiner* — Brandon Miller
(74) *Attorney, Agent, or Firm* — Patent Capital Group (57) ABSTRACT

A method is provided in one example embodiment and includes querying by a first communications network a database maintained by a second communications network for location data comprising a path typically taken by a mobile device; using the location data to identify network elements of the first communications network located proximate the path; and sending a page request for the mobile device only to the identified network elements. The method may further include mapping a first identifier for the mobile device to the second identifier for the mobile device; and using the second identifier to perform the querying. In certain embodiments, the mapping is initiated responsive to a call received for the mobile device.

17 Claims, 3 Drawing Sheets

(56) References Cited

U.S. PATENT DOCUMENTS

| | | |
|---|---|---|
| 2013/0317944 A1 | 11/2013 | Huang |
| 2014/0120948 A1* | 5/2014 | Jin et al. ............... 455/456.1 |
| 2014/0126489 A1* | 5/2014 | Zakrzewski ............ 370/329 |
| 2014/0155109 A1* | 6/2014 | Vaidya et al. ........... 455/458 |
| 2014/0302880 A1* | 10/2014 | Godin et al. ............ 455/458 |
| 2014/0334465 A1* | 11/2014 | Lee ................... H04W 48/18 370/338 |
| 2014/0348081 A1* | 11/2014 | Liao ...................... 370/329 |
| 2015/0032905 A1* | 1/2015 | Celebi ............... H04L 61/2015 709/245 |

* cited by examiner

REDUCING PAGING DELAYS USING LOCATION ANALYTICS IN COMMUNICATIONS NETWORKS

TECHNICAL FIELD

This disclosure relates in general to the field of communications networks and, more particularly, to techniques for reducing paging delays in such networks using location analytics.

BACKGROUND

Updating location/paging of mobile devices in wireless communications networks constitutes a significant problem; this is especially true as cells are growing smaller and the number of mobile users is increasing rabidly. Without knowing the whereabouts of the mobile device, the network has to page a large number of network elements to locate the mobile device. This has an enormous impact on the performance of the elements that do the paging. The cost of paging is primarily the radio bandwidth consumption in the wireless channels and the signaling exchange in the core network. A major concern for efficient mobility management in a cellular network is maintaining paging costs low while simultaneously maintaining a low paging delay. Paging in small cells increases the complexity of the problem because the network element responsible for paging (such as a Home NodeB Gateway ("HNB-GW")) is connected to a large number of small cells (e.g., HNBs) and the paging location areas may be deployed across small cell clusters.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes querying by a first communications network a database maintained by a second communications network for location data comprising a path typically taken by a mobile device; using the location data to identify network elements of the first communications network located proximate the path; and sending a page request for the mobile device only to the identified network elements. The method may further include mapping a first identifier for the mobile device to the second identifier for the mobile device; and using the second identifier to perform the querying. In certain embodiments, the mapping is initiated responsive to a call received for the mobile device. The first communications network may be a cellular communications network in which the network elements comprise Home Node Bs ("HNBs") and the second communications network may be a Wireless Local Area Network ("WLAN"). The the first identifier may be a MAC address of the mobile device. The second identifier may be one of an International Mobile Subscriber Identity ("IMSI") of the mobile device and a Universally Unique Identity ("UUID") of the mobile device. In one embodiment, the database comprises a location analytics database.

Example Embodiments

In one embodiment, the present disclosure comprises a technique for reducing paging delays in a wireless communications network using location analytics. In many instances, users of mobile devices follow a fairly predictable path on a daily basis. For example, consider the commute path of a working individual who typically takes the same route to reach the office each day. If such patterns can be utilized to increase the probability of locating a user's mobile device, they may enhance the ability to select which network access nodes to page before paging other nodes. Taking advantage of the ubiquitous presence of Wireless Local Area Networks ("WLANs") or WiFi networks, one could leverage data available from the existing WiFi networks to study and capitalize on such predictive behavior.

In certain implementations, location analytics data, which may be derived from a network device such as an integrated Mobility Services Engine ("MSE") available from Cisco Systems, Inc., of San Jose, Calif., can identify the usual paths that a user takes. The MSE can be queried to obtain such location data of a particular mobile device using the MAC address of the mobile device. Although in certain embodiments, the MSE is a part of a WiFi network, the user of the mobile device does not have to be associated with any WiFi network for the MSE to detect the mobile device and hence the user's location. The MSE may record the access point closest to the mobile device from the probe message without being sent from the UE devices. An interface may be established between the MSC and a Home NodeB Gateway ("HNB-GW") of a cellular communications network having a coverage area that overlaps with the WiFi network so that the HNB-GW can query the MSE to obtain a set of Home NodeBs ("HNBs") in whose coverage area the mobile device might be in when a page arrives for the mobile device. This would reduce the number of pages sent out by the HNB-GW and the HNBs under the control thereof.

Figure 1:
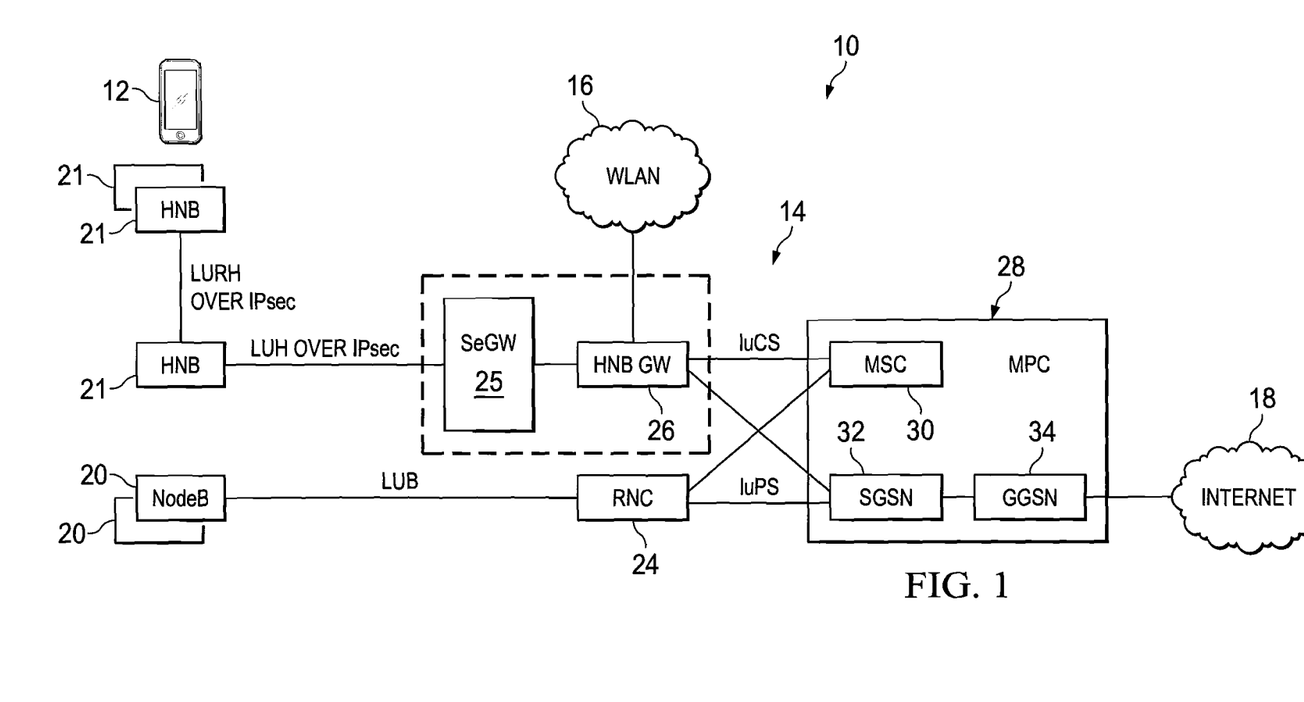
FIG. 1 is a simplified block diagram illustrating a system for reducing paging delays in wireless communication networks using location analytics in accordance with embodiments described herein.

Referring now to FIG. 1, illustrated therein is a block diagram of a system 10 for reducing paging delays in wireless communication networks using location analytics. According to an embodiment, the system 10 operates to provide services, such as mobile communication sessions, to endpoints, such as user equipment ("UE") 12. A communication session may refer to active communication between endpoints. Information such as voice, data, text, audio, video, multimedia, control, signaling other information, or any combination of the preceding, may be communicated during a communication session. Such information may be communicated in packets or any other format in accordance with a variety of protocols. A packet may comprise a bundle of data organized in a particular way for transmission and a frame may comprise the payload of one or more packets organized in a specific manner for transmission. A packet-based communication protocol, such as Internet Protocol ("IP"), may be used to communicate the packets.

UE 12 represents any suitable device operable to communicate within a communications network via a wireless link and comprises any suitable arrangement of components operable to form the operations of UE 12, including logic, a user interface, memory, other components, or any suitable combination of the preceding. UE 12 may comprise, for example, a personal digital assistant, a laptop computer, a cellular telephone, a mobile handset, or any other device operable to communicate with system 10. In one embodiment, UE 12 may be operable to communicate with different types of networks. For example, UE 12 may be operable to communicate with a cellular communications network such as cellular network 14, as well as an IP wireless local area network ("WLAN"), such as a Wi-Fi network 16.

A cellular network, such as the cellular network 14, provides communication services for UE 12 using any suitable cellular protocol and technology. The cellular network may use various cellular protocols and technologies, including but not limited to 3G and 4G protocols and technologies. In one embodiment, at least a portion of the network 14 is implemented as a 3G network. As illustrated in FIG. 1, the network 14 enables one or more UE, such as UE 12, to be connected to communicate data to and from the Internet 18 via a radio access network ("RAN") comprising a plurality of RAN nodes (represented in FIG. 1 by Node Bs 20 and HNBs 21), and a core network. In one embodiment, a portion of the the RAN is implemented as an HNB Access Network, in which RAN nodes 21 comprise HNBs, as defined in ETSI TS 22.220[11], for providing 3G radio coverage for UEs. HNBs may incorporate the capabilities of standard Node Bs, such as Node Bs 20, as well as radio resource management functions of a standard Radio Network Controller ("RNC"), such as RNC 24. As shown in FIG. 1, a Security Gateway ("SeGW") 25 establishes IPSec tunnels with HNBs 21, which may be accomplished using Internet Key Exchange version 2 ("IKEv2") signaling for tunnel management. The tunnels established by SeGW 25 are responsible for delivering voice, messaging, and packet data service3s between HNBs 21 and the core network. SeGW 25 forwards traffic from HNBs 21 to an HNB-GW 26. HNB-GW 26 aggregates traffic from a large number of HNBs, such as HNBs 21, and forward the aggregated traffic to the core network, which as illustrated in FIG. 1 is implemented as a Mobile Packet Core ("MPC") 28, via IuCS and IuPS interfaces. An Iuh interface between each HNB 21 and SeGW/HNB-GW 25/26 defines the security architecture used to provide secure, scalable communications over the Internet 18. The Iuh interface also defines a method for transporting Iu-based traffic and defines a Home Node B Application Part ("HNBAP") protocol for facilitating secure registration of HNBs with HNB-GW, identification of HNBs, and registration of UEs with HNB-GW through HNBs, thereby to support scalable ad hoc HNB deployment.

In the illustrated embodiment, the cellular network 14 includes a set of overlapping cell sites, each of which corresponds to a respective one of the HNBs 21. A cell site may comprise any suitable element operable to provide cellular wireless services to UE 12, as well as other mobile devices present in the service area of the cell site. Cell sites may provide service in any suitable configuration and/or geographic area. SeGW 25, HNB-GW 26 and HNBs 21 comprise an HNB subsystem and cover a geographic region comprising the collective service area of HNBs 21. HNBs 21 may communicate signals to and from UE 12 via a wireless link, which is commonly a radio frequency ("RF") link. Node Bs 20 may also communicate signals to and from UE 12 via a wireless link comprising an RF link.

As further illustrated in FIG. 1, the MPC 28 includes a Mobile Switching Center ("MSC") 30, which is connected to each of RNC 24 and HNB-GW 26 via a respective IuCS interface. MSC is responsible for routing voice calls and SMS, setting up and releasing end-to-end connections, managing mobility and handover requirements for a connection, and managing charging and account monitoring. MPC 28 also includes a Serving GPRS Support Node ("SGSN") 32 connected to RAN 24 and HNB-GW 26 via respective IuPS interfaces. SGSN 32 performs packet routing and transfer, mobility management, logical link management, and authentication and charging functionality. SGSN 32 may also store location information and user provides of all GPRS users registered with it. SGSN 32 is connected to a Gateway GPRS Support Node ("GGSN") 34. GGSN 34 performs internetworking between MPC 28 and external packet switched networks, such as Internet 18. GGSN 34 converts data packets from SGSN 32 into appropriate packet data protocol format (e.g., IP for Internet 18) and transmits them on the packet data network. Similarly, GGSN 34 readdresses packets received from external packet data networks and forwards them to the responsible SGSN.

UE 12 can be associated with clients, customers, or end users wishing to initiate a communication in system 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In regard to particular applications involving UE 12, media servers comprising one or more video servers may be provided, which can provide streaming video to an individual associated with UE 12 via the Internet 18. For example, an individual could be uploading (or streaming) video over the network to which UE 12 is connected. This could involve technologies such as flip video, webcams, YouTube, and various other video technologies involving any type of uploading and/or streaming video data.

For purposes of illustrating certain example techniques of communication system 10, it is important to understand the communications, including control signals, that may be traversing the network and the overload situations that can occur at various points in the system 10 due to such communications. It will be understood that, after a subscriber data session has been established in a conventional fashion between the UE 12 and the Internet 18, data packets from the UE 12 are encapsulated by the RAN elements in accordance with tunneling protocols between the RAN and the core network and then forwarded on to core network. The core network decapsulates the user data packets and forwards them to Internet 18. Conversely, data packets intended for the UE 12 are transmitted to the UE from the Internet 18 via the core network, which encapsulates them in accordance with the aforementioned tunneling protocols, and the RAN elements decapsulate the data packets upon receipt thereof.

Downlink data paging is the process by which an inactive, or idle, UE is contacted to receive data from an upstream source over the packet data network. A UE that is in an active state is associated with an eNodeB and has at least one active bearer. When the UE goes inactive, such as when it enters a low power mode, it releases all bearers. To locate an inactive UE, paging requests are issued to multiple HNBs, which is typically an expensive operation.

Figure 2:
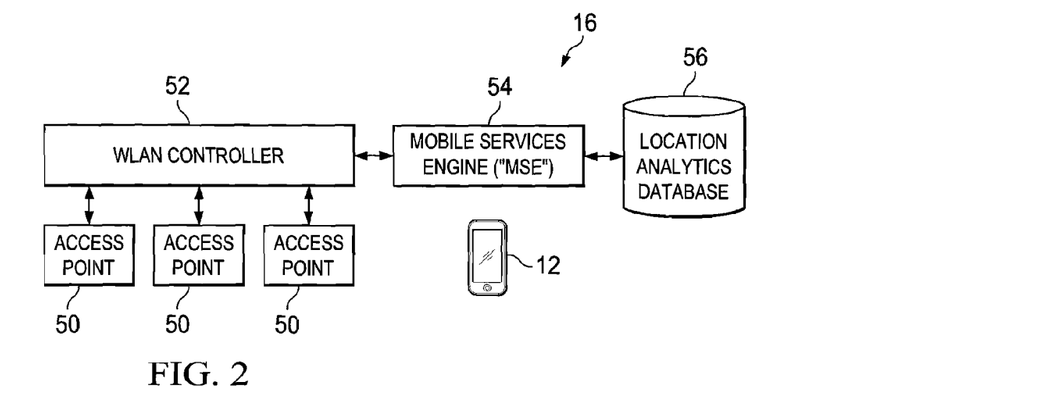
FIG. 2 is a simplified block diagram of a WLAN portion of the system of FIG. 1 in accordance with embodiments described herein.

Referring now to FIG. 2, illustrated therein is a simplified block diagram of a WLAN, or Wi-Fi network, such as the WLAN 16, in accordance with embodiments described herein. As previously noted, WLAN 16 provides communication services for mobile device 12 using any suitable wireless protocol and technology. Additionally, WLAN 16 utilizes wireless standards, such as the IEEE 802.11 family of wireless standards, to provide wireless communications services to mobile devices present in the service area of WLAN, such as UE 12. As shown in FIG. 2, WLAN 16 includes multiple access points, represented in FIG. 2 by access points 50(1)-50(3), all connected to a WLAN controller 52. In accordance with features of an embodiment, the WLAN controller 52 is connected to an MSE 54, which will be described in greater detail herein below. Each of the access points 50(1)-50(3) communicates signals to and from UEs anchored with the access point. Each of the access points 50(1)-50(3) comprises a network element, including hardware and appropriate controlling logic for providing wireless access to WLAN 16 using any appropriate wireless standard or protocol. One or more of the access points 50(1)-50(3) may be implemented as a wireless router that may include access point logic, a router, an Ethernet switch and/or a broadband modem. In the illustrated embodiment, a Location Analytics Database 56 is connected to the MSE 54. The LAD 56 serves as a repository for location analytics information developed by the MSE 54 as described herein. It will be recognized that although the LAD 56 is illustrated as comprising a separate component from the MSE 54, in other embodiments, the LAD may be integrated with the MSE. In still other embodiments, the LAD 56 may be connected to the MSE 54 via a network and/or the Internet.

As previously noted, as shown in FIG. 2, WLAN 16 includes MSE 54, which comprises a platform for enabling centralized delivery of WiFi based mobility services. In one embodiment, data from the Cisco MSE calculates discrete time, location, and MAC addresses of UEs within the coverage area of WiFi access points in the network. A particular UE need not be associated with the WLAN 16 to be identified and have its location estimated. The data enables estimation of behaviors through different parts of the WLAN coverage area and can be assembled into a set of chronological points per UE, or paths, on which movement analytics can be applied. With the potentially enormous amounts of data, to get valuable insights requires application of data mining techniques and filtering. Operation of the MSE 54 in accordance with embodiments described herein will be provided in greater detail hereinbelow.

Figure 3:
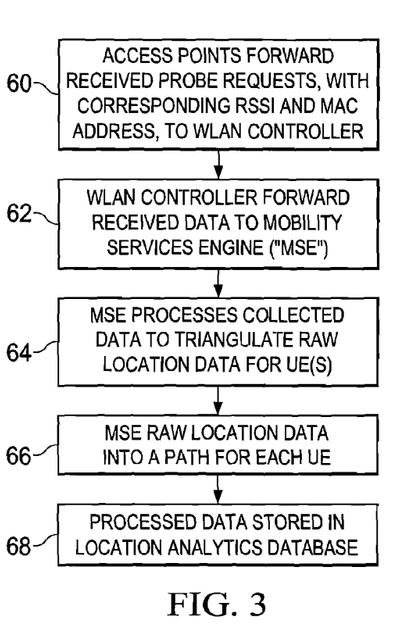
FIG. 3 is a flowchart illustrating operation of an MSE of the WLAN of FIG. 2 in accordance with embodiments described herein.

FIG. 3 illustrates generation of MSE data in accordance with one embodiment. When a WiFi client device (such as UE 12) is enabled, it transmits 802.11 Probe Request packets to identify (by Service Set Identifier ("SSID")) the wireless networks in its vicinity and also to determine the received signal strength indication ("RSSI") associated with the identified SSID(s). Even after becoming associated with a particular access point in a WLAN, the UE will continue to transmit 802.11 Probe Request packets to identify and potentially roam for other access points, for better quality of service. In step 60, in response to receipt of a Probe Request from UE, an access point forwards the received Probe Request and associated RSSI, along with the MAC address of the UE from which the Request was received, to the WLAN controller managing the access point. In step 62, the WLAN controller forwards the received information to the MSE. In step 64, the MSE uses the collected data to triangulate the location of the UE by translating the access point RSSIs to X, Y, and Z coordinates in space. As the UE moves through the network of access points, the MSE may continuously track the location of the UE in time. In practice, most UEs are designed to save battery life; therefore, the periodicity of the Probe Requests to other access points may be on the order of several seconds. This indirectly translates to the MSE having discrete time location snapshots instead of a continuous stream. Since the identifier (e.g., MAC address) is unique to a particular UE, the result is that a chronological trail of points is developed, describing the movement or path of an individual through the geographical area comprising the WLAN. While such "snapshots" of UE movement may not provide a complete picture of a user's movement, from the potentially millions of data points recorded each week, it may be possible to identify a good set of user data from which to derive valuable predictive information with regard to the UE.

In step 66, MSE processes the raw location data into a path for each UE. Given that a UE may appear within the WLAN several times within a day, a default cutoff of one hour with no datapoints indicates that a path or visit is over. Additional characteristics may be introduced with regard to UEs and corresponding paths, such as whether the UE was associated or probing, the zones through which it passed, and identification of the user as a particular type of user. Any such characteristics may be deduced by the time and location combination in the data. For example, airports need to differentiate arriving from departing passengers; this information can be deduced by understanding the order of movement between air-side and land-side areas of the venue. Other logical tags can be associated with the UEs and can be used for alter reporting. Although little information beyond UE manufacturer can be gleaned directly from the MAC address, there is the option to hash the address to ensure another level of privacy for the user of the UE. In step 68, the processed data is stored in a database, which may be integrated into or associated with MSE. Processed data may be stored in a manner that renders it easily searchable for one or more particular applications and/or uses. For example, the data may be used to determine precisely where a UE is currently or has recently been located in the coverage area and/or to predict where a UE may be located at a particular time given historical location data for the UE.

Location analytics provides two orthogonal ways in which to look at the processed data. The first is from the perspective of the venue and what occurs in different parts thereof. The second is from the perspective of the UE passing through different parts of the venue (i.e., paths followed). Once the parts of the venue have been established, a set of measurements can be made detailing what occurs within them. Location analytics may provide two methods for defining the various parts of a venue. "Explicit zones" can be defined by the user as named polygons that represent known defined spaces. Each space can be busy or empty and thin or wide. The important factors are that each of the zones is identifiable by name and information pertaining to it can be put into a known context. "Dynamic areas" are generated mathematically based on where points are located. This process breaks the venue into cluster areas using a location based k-means algorithm. The latter option provides the advantage of providing the user with immediate feedback on different parts of the venue, including when zones are either not clear or not immediately available. This option can also be used to break up an explicit zone into areas representing different behaviors, such as areas with more and less crowding or slow and fast movement.

Figure 4:
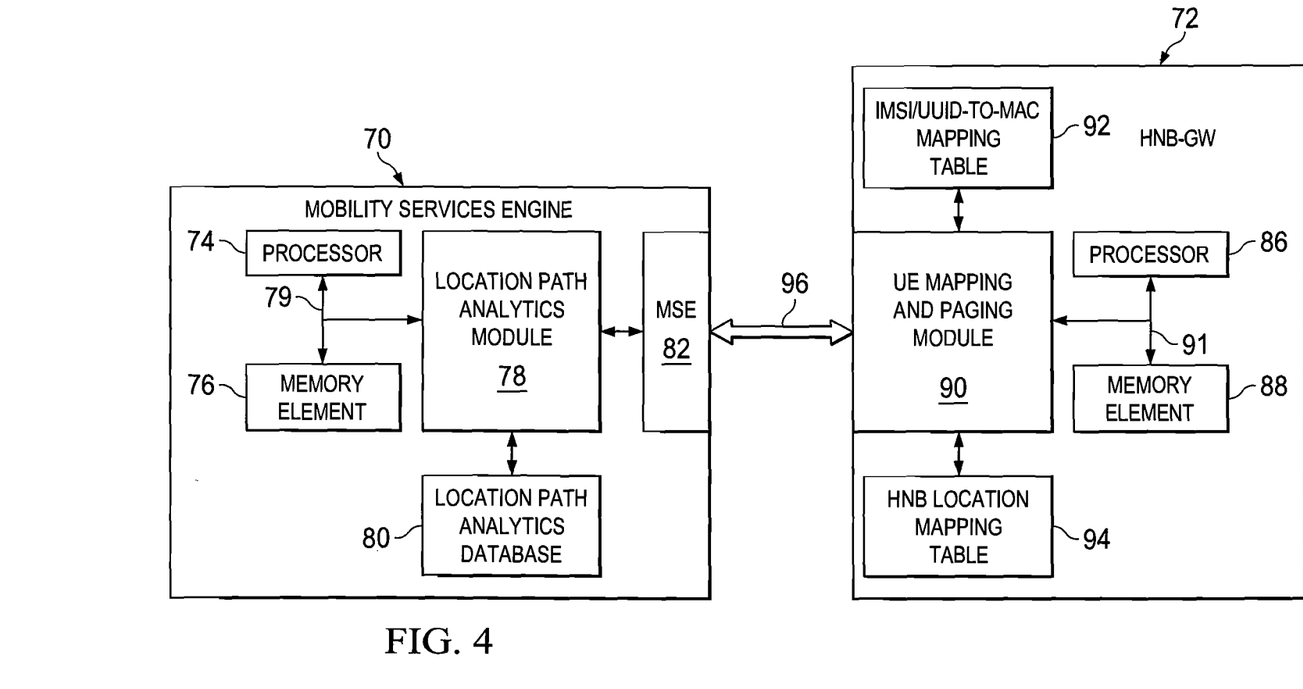
FIG. 4 is a simplified block diagram illustrating an interface between an MSE and a HNB-GW in accordance with embodiments described herein.

FIG. 4 is a simplified block diagram of an example interface between an MSE 70, which is similar to the MSE 54 (FIG. 2), and an HNB-GW 72, which is similar to HNB-GW 26 (FIG. 1). As shown in FIG. 4, the MSE 70 includes a processor 74, a memory element 76, and a Location Analytics module ("LAM") 78 all interconnected via a bus 79. MSE 70 further includes an LAD 80 connected to the LAM 78. As previously noted, the LAD 80 may be implemented as a separate component from the MSE 70, in which case it would be connected to and accessible by the LAM 78. In certain embodiments, MSE 70 may provide an API (e.g., Mobility Services API) 82 with support for REST. The API data is presented to the processed analytics data (points, paths, and UEs), as well as to the result information. The API enables use of industry-specific analytics and also enables users to export results into existing reports or Management information system. The API 82 provides a robust interface to MSE raw data as well.

The HNB-GW 72 includes a processor 86, a memory element 88, and a UE Mapping and Paging Module ("UEMPM") 90 all interconnected via a bus 91. The UEMPM 90 has access to an International Mobile Subscriber Identity ("IMSI")/Universally Unique Identifier ("UUID")-to-MAC mapping table ("ID mapping table") 92 and an HNB location mapping table ("location mapping table") 94. Similarly to the LAD 80, the mapping tables 92, 94, may be integrated into the HNB-GW 72 in certain embodiments, as illustrated in FIG. 4, or may be disposed in a storage device external to and separate from HNB-GW 72 in a manner in which the tables are easily accessible by UEMPM 90. The mapping table 92 may also be maintained within the MSE 70.

Figure 5:
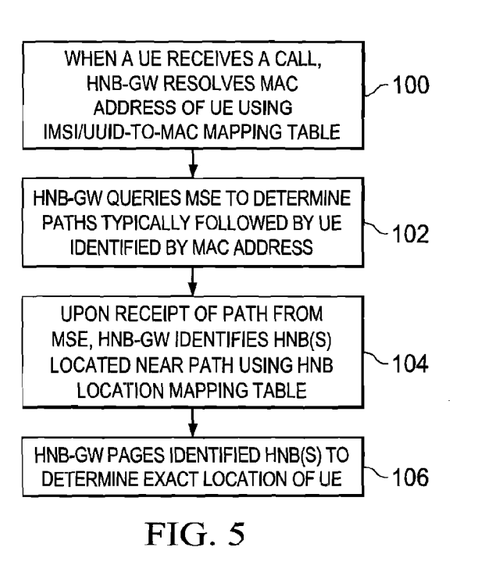
FIG. 5 is a flowchart illustrating operation of a HNB-GW of the system of FIG. 1 in accordance with embodiments described herein for for reducing paging delays in wireless communication networks using location analytics.

FIG. 5 is a flowchart of a process for reducing paging delays in wireless communication networks using location analytics in accordance with emodiments described herein. In step 100, when a UE receives a call, HNB-GW, such as HNB-GW 72 (FIG. 4), resolves a MAC address of the UE using an ID mapping table, such as ID mapping table 92 (FIG. 4). In step 102, HNB-GW queries the MSE, such as MSE 70 (FIG. 4), with the MAC address developed in step 100 to determine paths typically followed by the UE identified by the MAC address. In step 103, the LAM, such as LAM 78 (FIG. 4), of the MSE queries the LPD, such as LPD 80 (FIG. 4) of the MSE to obtain the data regarding the path(s) normally followed by the UE identified by the MAC provided in the query. In step 104, upon receipt of the path data from the MSE, HNB-GW identifies one or more HNBs located near the path using the location mapping table, such as location mapping table 94. In step 106, HNB-GW pages the HNB(s) identified in step 104 to determine the exact location of the UE.

Referring again to FIG. 4, memory elements 76, 88, comprises a plurality of storage locations that are addressable by the respective processor 74, 86, for storing software programs and data structures associated with the embodiments described herein. Processors 74, 86, may include hardware elements or hardware logic adapted to execute software programs, such as embodied in modules 78, 90, and manipulate data structures in the memory elements 76, 88. Module 78 may comprise processes and/or services as described herein and may interact with and manipulate a database, such as LAD 80. Module 90 may comprise processes and/or services as described herein and may interact with and manipulate mapping tables 92, 94.

In some embodiments, the HNB-GW may periodically "ping" the MSE for path information for a selected group of UEs, thereby to update the location mapping table maintained within the HNB-GW. In this manner, the updating need not occur responsive to receipt of a call for one of the UEs of the selected group of UEs; rather, the internal location mapping table will be maintained substantially up-to-date so that it may be used immediately to determine which HNBs to page.

Although embodiments have been shown and described in connection with configuration of network devices, it will be recognized that the techniques described herein are equally applicable to network maintenance applications. In summary, the above-described embodiments operate to reduce paging delays in a wireless communication network using location analytics provided by an MSE of a WLAN that geographically overlaps with the wireless communication network.

It should be noted that much of the infrastructure discussed herein could be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the activities discussed herein. This could include the implementation of instances of any of the components, engines, logic, modules, etc., shown in the FIGURES. Additionally, each of these devices can have an internal structure (e.g., a processor, a memory element, etc.) to facilitate some of the operations described herein. In other embodiments, the activities may be executed externally to these devices, or included in some other device to achieve the intended functionality. Alternatively, these devices may include software (or reciprocating software) that can coordinate with other elements in order to perform the activities described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, various nodes involved in implementing the embodiments described herein can include software for achieving the described functions. For example, referring again to FIG. 4, the modules 78, 90 may comprise software embodied in one or more tangible media for facilitating the activities described herein. Memory elements 76, 88, may store information to be used in achieving the functions as outlined herein. Additionally, processors 74, 86, are capable of executing software or an algorithm (such as embodied in modules 76, 88) to perform the functions as discussed in this Specification and particularly as illustrated in FIGS. 3 and 5. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   querying by a network device of a first communications network a database maintained by a second communications network for historical location data comprising multiple points along a path typically traversed by a mobile device;
   using the location data to identify network elements of the first communications network located proximate the path; and
   sending a page request for the mobile device only to the identified network elements;
   wherein the first communications network is a cellular communications network and the network elements comprise Home Node Bs ("HNBs"); and
   wherein the second communications network is a Wireless Local Area Network ("WLAN").

2. The method of claim 1, further comprising:
   mapping a first identifier for the mobile device to a second identifier for the mobile device; and
   using the second identifier to perform the querying.

3. The method of claim 2 wherein the mapping is initiated responsive to a call received for the mobile device.

4. The method of claim 2, wherein the first identifier is a MAC address of the mobile device.

5. The method of claim 2, wherein the second identifier is at least one of an International Mobile Subscriber Identity ("IMSI") of the mobile device and a Universally Unique Identity ("UUID") of the mobile device.

6. The method of claim 1, wherein the network device is an HNB Gateway ("HNB-GW").

7. The method of claim 1, wherein the database comprises a location analytics database.

8. One or more non-transitory tangible media that includes code for execution and when executed by a processor is operable to perform operations comprising:
   querying by a network device of a first communications network a database maintained by a second communications network for historical location data comprising multiple points along a path typically traversed by a mobile device;

using the location data to identify network elements of the first communications network located proximate the path; and sending a page request for the mobile device only to the identified network elements;

wherein the first communications network is a cellular communications network and the network elements comprise Home Node Bs ("HNBs"); and wherein the second communications network is a Wireless Local Area Network ("WLAN").

9. The media of claim 8, wherein the operations further comprise:

mapping a first identifier for the mobile device to a second identifier for the mobile device; and using the second identifier to perform the querying.

10. The media of claim 9 wherein the mapping is initiated responsive to a call received for the mobile device.

11. The media of claim 8, wherein the network device is an HNB Gateway ("HNB-GW").

12. An apparatus comprising:

a memory element configured to store data;

a processor operable to execute instructions associated with the data; and a mapping and paging module disposed in a first communications network configured to:

query by a first communications network a database maintained by a second communications network for historical location data comprising multiple points along a path typically traversed by a mobile device;

use the location data to identify network elements of the first communications network located proximate the path; and send a page request for the mobile device only to the identified network elements;

wherein the first communications network is a cellular communications network and the network elements comprise Home Node Bs ("HNBs"); and wherein the second communications network is a Wireless Local Area Network ("WLAN").

13. The apparatus of claim 12, wherein the mapping and paging module is further configured to:

map a first identifier for the mobile device to a second identifier for the mobile device; and use the second identifier to perform the querying.

14. The apparatus of claim 13 wherein the mapping is initiated responsive to a call received for the mobile device.

15. The apparatus of claim 13, wherein the first identifier is a MAC address of the mobile device and the second identifier is at least one of an International Mobile Subscriber Identity ("IMSI") of the mobile device and a Universally Unique Identity ("UUID") of the mobile device.

16. The apparatus of claim 12, wherein the database comprises a location analytics database.

17. The apparatus of claim 12, wherein the mapping and paging module comprises an HNB Gateway ("HNB-GW").

* * * * *